United States Patent [19]
Dehner et al.

[11] Patent Number: 6,084,886
[45] Date of Patent: Jul. 4, 2000

[54] METHOD AND APPARATUS FOR FACILITATING ESTABLISHMENT OF COMMUNICATIONS IN A MESSAGING SYSTEM

[75] Inventors: Leo G. Dehner, Southlake; Slim Souissi, Fort Worth, both of Tex.

[73] Assignee: Motorola, Inc., Schaumburg, Ill.

[21] Appl. No.: 08/940,720

[22] Filed: Sep. 30, 1997

[51] Int. Cl.[7] .................................................. H04L 12/43
[52] U.S. Cl. ...................... 370/458; 370/210; 455/182.3; 455/184.1; 455/192.3
[58] Field of Search .............................. 455/182.2, 182.3, 455/450, 452, 453, 456, 35.1, 36.1, 38.5, 509, 103, 104, 279, 173.1, 174.1, 178.1, 180.3, 183.2, 186.1, 502, 503, 77, 87, 183.1, 184.1, 192.3, 193.1; 370/458, 328, 338, 210, 304, 321, 324, 503, 509, 510

[56] References Cited

U.S. PATENT DOCUMENTS

| | | | |
|---|---|---|---|
| 4,875,038 | 10/1989 | Siwiak et al. | 370/313 |
| 5,305,308 | 4/1994 | English et al. | 370/349 |
| 5,457,680 | 10/1995 | Kamm et al. | 370/349 |
| 5,487,186 | 1/1996 | Scarpa | 455/182.2 |
| 5,592,480 | 1/1997 | Carney et al. | 370/347 |
| 5,596,330 | 1/1997 | Yokev et al. | 342/387 |
| 5,652,772 | 7/1997 | Isaksson et al. | 375/367 |
| 5,724,662 | 3/1998 | Goldberg et al. | 455/503 |
| 5,752,166 | 5/1998 | Dorenbosch et al. | 455/69 |
| 5,765,109 | 6/1998 | Chavez, Jr. | 455/553 |

OTHER PUBLICATIONS

George L. Turin et al., "Simulation of Urban Vehicle–Monotoring Systems", pp. 9–16, 1972, USA.
Louis A. Stilp, "TDOA Technology for Locating Narroband Cellular Signals," pp. 90, 92, 94, 96, Apr. 1997, USA.
William C.Y. Lee, "Mobile Cellular Telecommunications Systems", pp. 307–309, 1989, USA.

*Primary Examiner*—Dang Ton
*Assistant Examiner*—Phirin Sam
*Attorney, Agent, or Firm*—R. Louis Breeden

[57] ABSTRACT

A digital sync signal (502) is transmitted (702) from K transmitters (206) of a cluster (402), followed by K fine tuning signals (506) during K time slots (510), each time slot assigned to a transmitter. Each fine tuning signal comprises a pair of tones (512) separated in frequency by a predetermined amount. A portable subscriber unit (122) receives (706) the sync signal and the fine tuning signals, and makes (708) a rough estimate of the beginning of the fine tuning signals from the sync signal and from knowledge about the time slots. The portable subscriber unit computes (710) for each time slot a 2M-point Fourier transform (FT) on a received signal including M fine tuning signals received during the time slot from a transmitter of the cluster and from M-1 corresponding transmitters of adjacent clusters (404). The portable subscriber unit then fine tunes (722) the rough estimate through FT calculations.

24 Claims, 4 Drawing Sheets

METHOD AND APPARATUS FOR FACILITATING ESTABLISHMENT OF COMMUNICATIONS IN A MESSAGING SYSTEM

FIELD OF THE INVENTION

This invention relates in general to wireless communication systems, and more specifically to a method and apparatus for facilitating establishment of communications in a messaging system.

BACKGROUND OF THE INVENTION

Two-way wireless messaging systems are known. As such messaging systems have evolved, there has been a need to communicate larger amounts of data to satisfy customer requirements. This need has brought about a requirement for higher speed modulation techniques, such as quadrature amplitude modulation (QAM). Higher transmission speeds result in a need for location of the portable subscriber unit for which a message is intended. This is because simulcast transmissions cannot be used at high transmission speeds due to the degrading effects of differential transmission delay on very short duration symbols. Instead, a non-simulcast transmission from a single transmitter close to the subscriber unit is required, thus forcing the need for location of the subscriber unit.

On the other hand, a small amount of simulcast transmission remains necessary, for example, to locate the subscriber unit when its position is unknown, or to send a system-wide command affecting all subscriber units. Simulcast transmissions have been utilized also for synchronization of the subscriber units throughout the messaging system. Unfortunately, simulcast synchronization signals alone do not have sufficient accuracy and resolution for synchronizing the very high speed transmissions possible with non-simulcast transmission.

Thus, what is needed is a method and apparatus for synchronizing the subscriber unit when higher speed modulation techniques are employed. Also needed is a method and apparatus for locating the subscriber unit.

SUMMARY OF THE INVENTION

An aspect of the present invention is a method for facilitating an establishment of communications in a messaging system. The method comprises in K transmitters of a first cluster, K being a predetermined positive integer, the steps of simulcasting a digital sync signal, and thereafter transmitting K fine tuning signals during K time slots, each time slot assigned to one of the transmitters. Each fine tuning signal comprises a pair of tones separated in frequency by a predetermined amount and having a beginning characterized by a relative phase of a predetermined value. The method further comprises in a portable subscriber unit the steps of receiving the digital sync signal and the fine tuning signals, and making a rough estimate of the beginning of the fine tuning signals from the digital sync signal and from knowledge of a predetermined arrangement of the time slots. The method further comprises in the portable subscriber unit the step of computing for each of the time slots a 2M-point Fourier transform (FT) on a received signal comprising M fine tuning signals received during the time slot from a transmitter of the first cluster and from M-1 corresponding transmitters of adjacent clusters. The method also includes in the portable subscriber unit the step of fine tuning the rough estimate through FT calculations corresponding to at least one of the fine tuning signals, thereby generating a fine estimate of the beginning of the at least one of the fine tuning signals.

Another aspect of the present invention is a portable subscriber unit for facilitating an establishment of communications in a messaging system. The portable subscriber unit comprises a receiver for receiving a digital sync signal and K fine tuning signals transmitted by K base transmitters in a fixed portion of the messaging system during K time slots, K being a predetermined positive integer, wherein each fine tuning signal comprises a pair of tones separated in frequency by a predetermined amount and having a beginning characterized by a relative phase of a predetermined value. The portable subscriber unit further comprises a processing system coupled to the receiver for making a rough estimate of the beginning of the fine tuning signals from the digital sync signal and from knowledge of a predetermined arrangement of the time slots. The processing system is programmed to compute for each of the time slots a 2M-point Fourier transform (FT) on a received signal comprising M fine tuning signals received during the time slot from a transmitter of the first cluster and from M-1 corresponding transmitters of adjacent clusters. The processing system is also programmed to fine tune the rough estimate through FT calculations corresponding to at least one of the fine tuning signals, thereby generating a fine estimate of the beginning of the at least one of the fine tuning signals.

Another aspect of the present invention is a controller for facilitating an establishment of communications in a messaging system including K base transmitters of a first cluster, K being a predetermined positive integer. The controller comprises a network interface for receiving a message, and a processing system coupled to the network interface for processing the message. The controller further comprises a base station interface coupled to the processing system for controlling the base transmitters to transmit the message and for cooperating with a base receiver to receive a response from a portable subscriber unit. The processing system is programmed to control the base transmitters to simulcast a digital sync signal, and to further control the base transmitters to transmit K fine tuning signals during K time slots, each time slot assigned to one of the transmitters, wherein each fine tuning signal comprises a pair of tones separated in frequency by a predetermined amount and having a beginning characterized by a relative phase of a predetermined value.

DETAILED DESCRIPTION OF THE DRAWINGS

Figure 1:
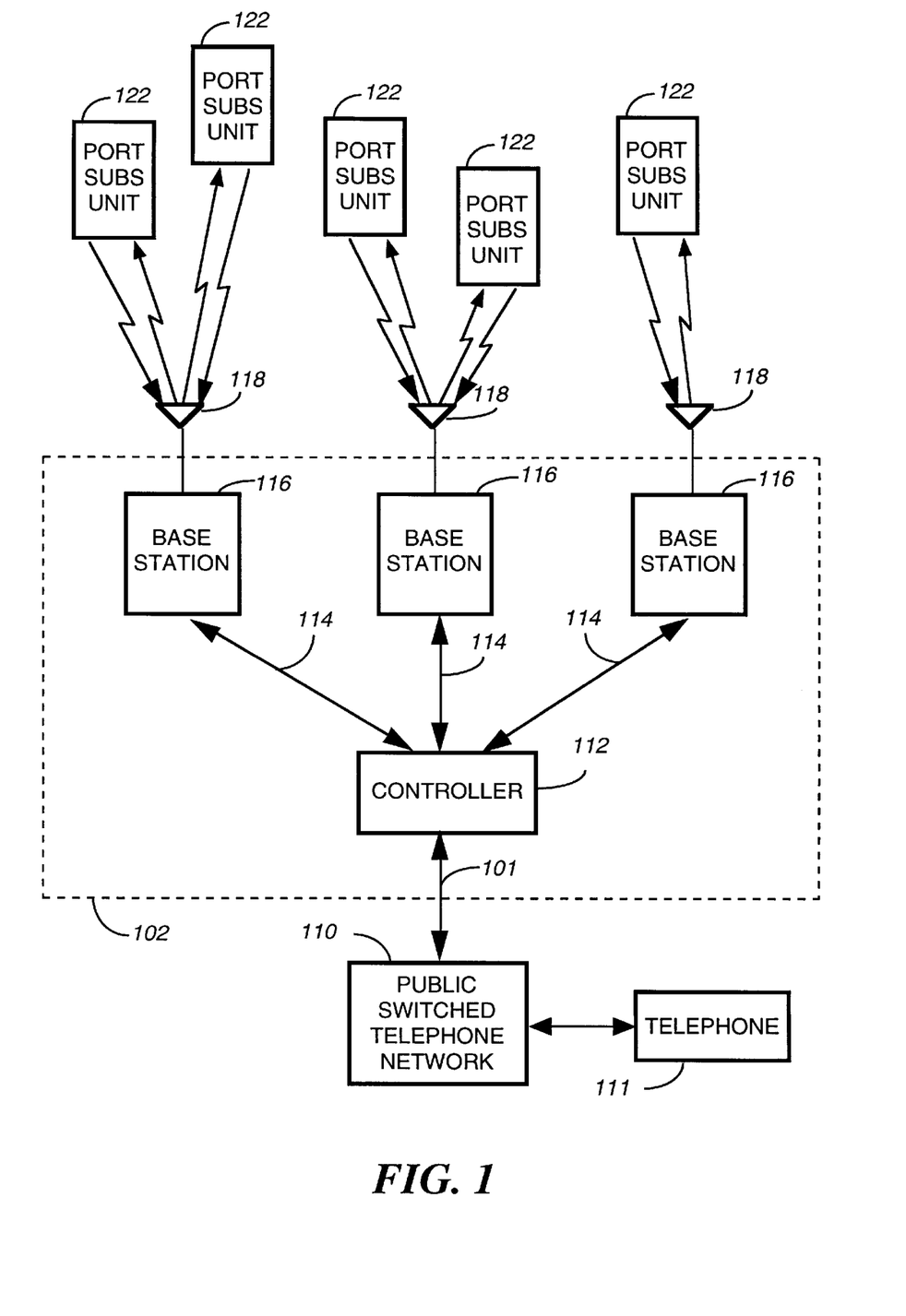
FIG. 1 is an electrical block diagram of an exemplary messaging system in accordance with the present invention.

Referring to FIG. 1, an electrical block diagram of an exemplary messaging system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receiver manufactured by Motorola, Inc. The hardware of the portable subscriber unit 122 is preferably similar to that of the PageFinder™ messaging unit also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each preferably receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference. It will be appreciated that, alternatively, the present invention can be applied to a one-way messaging system, with some feature limitations.

The controller 112 preferably is coupled by telephone links 101 to a public switched telephone network (PSTN) 110 for receiving selective call message originations therefrom. Selective call originations comprising messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEX™ two-way digital selective call signaling protocol, modified in accordance with the present invention. This protocol utilizes well-known error detection and error correction techniques and is therefore tolerant to bit errors occurring during transmission, provided that the bit errors are not too numerous in any one code word. It will be appreciated that other suitable protocols can be used as well.

Figure 2:
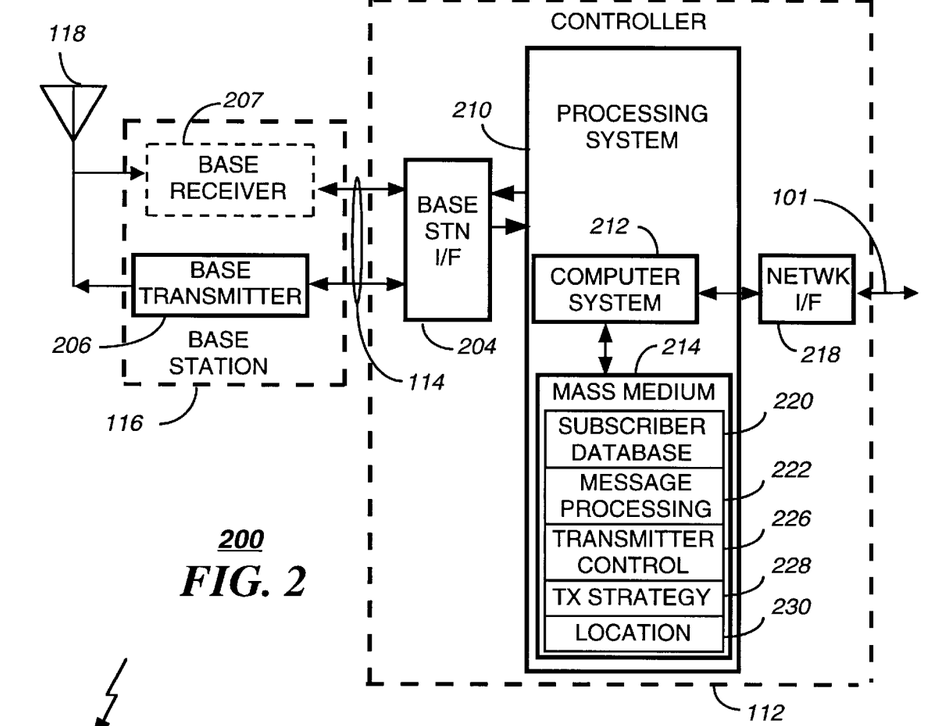
FIG. 2 is an electrical block diagram of portions of a controller and a base station in accordance with the present invention.

FIG. 2 is an electrical block diagram 200 of portions of the controller 112 and the base station 116 in accordance with the present invention. The controller 112 includes a processing system 210, a conventional base station interface 204, and a conventional network interface 218. The base station 116 includes a base transmitter 206 and preferably at least one base receiver 207.

The processing system 210 is used for directing operations of the controller 112. The processing system 210 preferably is coupled through the base station interface 204 to the base transmitter 206 via the communication link 114. The processing system 210 preferably also is coupled through the base station interface 204 to the base receiver 207 via the communication link 114. It will be appreciated that, alternatively, the base receiver 207 can be omitted in a one-way messaging system.

The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber user information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receiver 207.

The mass medium 214 preferably includes software and various databases utilized in accordance with the present invention. In particular, the mass medium 214 includes a message processing element 222 which programs the processing system 210 to process messages in accordance with the present invention, as will be described further below. In addition, the mass medium 214 includes a transmitter control element 226 and a transmission strategy element 228 for controlling the base transmitters 206 in accordance with the present invention. The mass medium also includes a location element 230 for determining the location of the portable subscriber unit 122 in accordance with the present invention. It will be appreciated that the controller 112 and the base station 116 can be either collocated or remote from one another, depending upon system size and architecture. It will be further appreciated that in large systems functional elements of the controller 112 can be distributed among a plurality of networked controllers.

Figure 3:
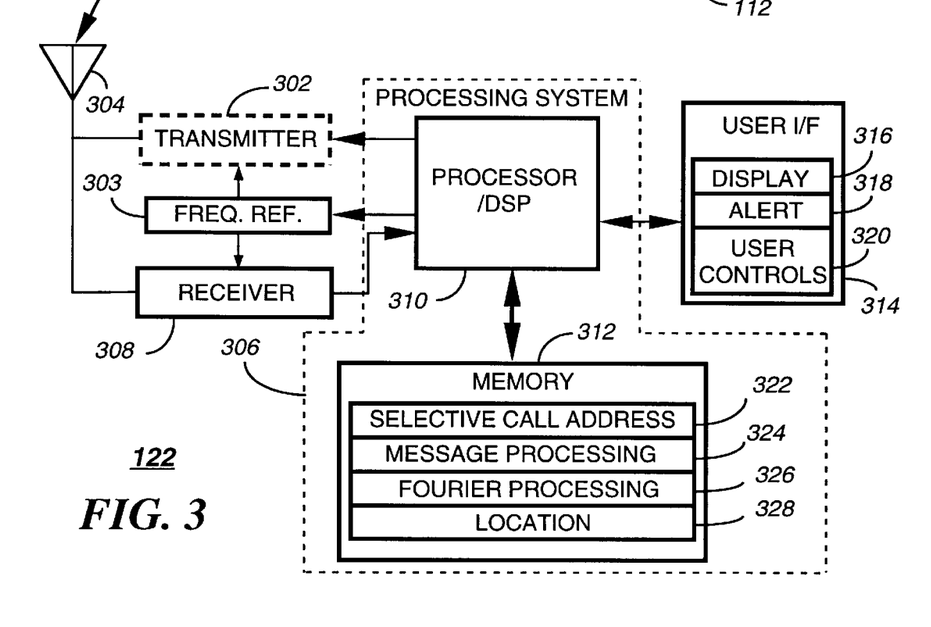
FIG. 3 is an electrical block diagram of a portable subscriber unit in accordance with the present invention.

Referring to FIG. 3, an electrical block diagram of the portable subscriber unit 122 in accordance with the present invention comprises an antenna 304 for intercepting transmissions from the base stations 116. The antenna 304 is coupled to a conventional receiver 308 for receiving the transmissions to derive information therefrom. Preferably, the antenna 304 is also coupled to a transmitter 302 for transmitting information to the fixed portion 102 of the messaging system. The receiver 308 and the transmitter 302 are coupled to a processing system 306, comprising a conventional processor 310, preferably a digital signal processor (DSP) for processing the received and transmitted information. In particular, the preferred embodiment uses a model 56800 DSP manufactured by Motorola, Inc. It will be appreciated that, alternatively, other similar DSPs can be utilized as well for the processor 310. The transmitter 302 and the receiver 308 preferably are also coupled to a frequency reference 303. The frequency reference 303 is coupled to the processing system 306 such that the processing system can tune the portable subscriber unit 122 to a communication channel by adjusting the frequency reference in accordance with pairs of tones transmitted in a plurality of fine tuning signals, as described further below. It will be appreciated that, alternatively, the transmitter 302 can be omitted, e.g., in a one-way messaging system.

The processing system 306 is also preferably coupled to a user interface 314 for conveying portions of the received information to a user, via, for example, a conventional liquid crystal display 316. The user interface 314 also includes a conventional alert element 318 for alerting the user that new information has arrived. In addition, the user interface 314 includes well-known user controls 320 for controlling the subscriber unit 122. The processor 310 is coupled to a conventional memory 312 for storing a selective call address 322 to which the subscriber unit 122 is responsive. The memory 312 also includes a message processing element 324 for programming the processing system 306 in accordance with the present invention. In particular, the memory 312 includes a Fourier processing element 326 for programming the processing system to perform Fourier transform calculations, and a location element 328 for determining the location of the portable subscriber unit 122, in accordance with the present invention, as described herein below. Alternatively, the location element 328 can be omitted in one-way systems.

Figure 4:
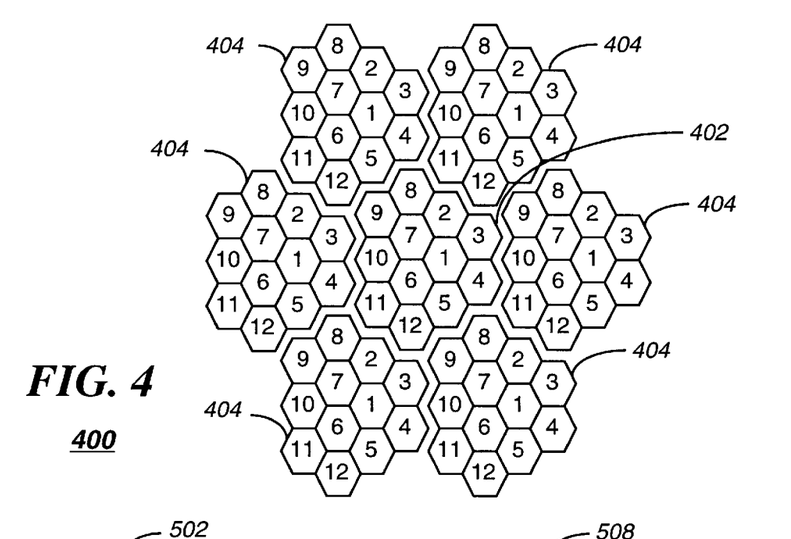
FIG. 4 is an exemplary slot assignment diagram for transmitters of the messaging system in accordance with the present invention.

FIG. 4 is an exemplary slot assignment diagram 400 for the base transmitters 206 of the messaging system in accordance with the present invention. The diagram depicts a plurality of hexagonal cells around base transmitters 206 numbered 1–12 and grouped into a first cluster 402 and six adjacent clusters 404. Each cell represents an idealized coverage area provided by a base transmitter 206 positioned at the center of each cell. The transmitter number within each cell corresponds to a time slot during which the transmitter transmits a fine tuning signal comprising a pair of tones, as described below.

Figure 5:
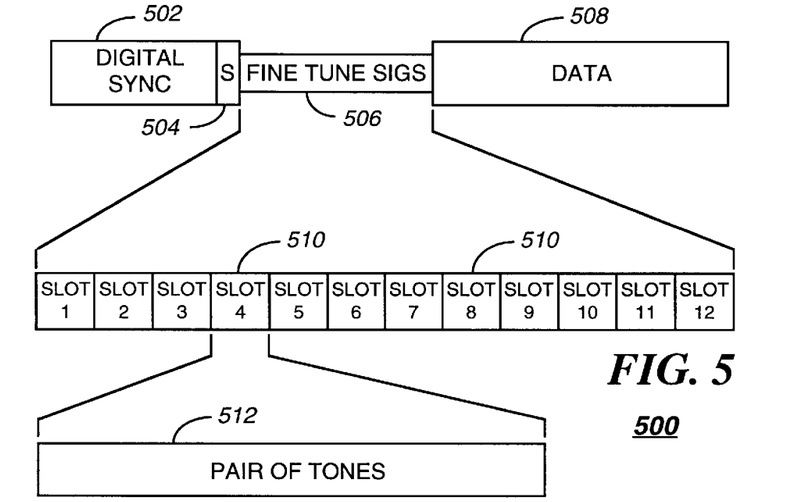
FIG. 5 is an exemplary protocol timing diagram for the messaging system in accordance with the present invention.

FIG. 5 is an exemplary protocol timing diagram 500 for the messaging system in accordance with the present invention. The diagram 500 represents a portion of the communication protocol used for outbound transmissions. The protocol comprises a digital sync signal 502 followed by a brief period, e.g., 25 msec., of silence 504. The silence 504 is followed by K fine tuning signals 506, each transmitted in one of K time slots 510. Preferably the value of K is equal to the number of base transmitters 206 in a cluster 402, 404. Thus, for the exemplary slot assignment diagram 400 the value of K is 12. Each of the time slots 510 includes a pair of tones 512, i.e., a pair of carriers, transmitted for a first predetermined duration, e.g., 7.5 msec. Preferably, the slot number corresponds to the transmitter numbers of the diagram 400, e.g., during slot 4 all the transmitters assigned the number 4 transmit their respective tone pairs. Preferably, the tone pairs of each cluster 402, 404 are different, the tone frequencies being shifted by a predetermined frequency shift, e.g., 400 Hz. Also, preferably, the pair of tones 512 are Blackman windowed for improved performance, using well-known techniques. It will be appreciated that, alternatively, other window functions, such as Hamming or Hanning windows can be used as well to improve the performance.

Figure 6:
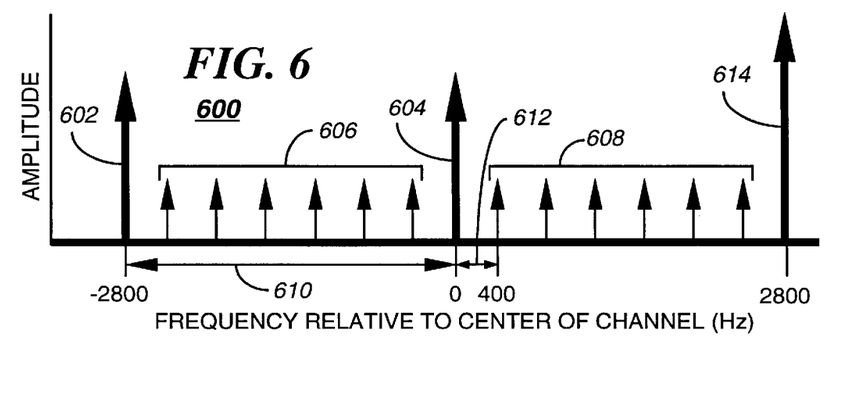
FIG. 6 is an exemplary idealized spectrum diagram in accordance with the present invention.

FIG. 6 is an exemplary idealized spectrum diagram 600 in accordance with the present invention. The diagram 600 depicts the spectrum received by a portable subscriber unit 122 during a single time slot. If, for example, the time slot is slot 4 and the portable subscriber unit 122 is positioned in the central cluster 402, the dominant tone pair 602 and 604 are from transmitter number 4 in the central cluster. The 6 weaker tone pairs 606, 608 are from the transmitters number 4 of the adjacent clusters 404. The tones of each tone pair are separated in frequency by a predetermined amount 610, e.g., 2800 Hz. The tone pairs of different adjacent clusters 402, 404 are shifted 612 in frequency by 400 Hz from one another. This value advantageously assures orthogonality among all the tones when the slot duration is 7.5 msec. Each transmitter of a given cluster 402, 404 sends the same two-frequency tone pair during its respective time slot. Thus, the cluster 402, 404 can be identified from the tone pair frequencies, and the transmitter can be identified from the time slot. Preferably, the signal 614 is a reference frequency different from the frequencies of the tone pairs 602, 604, 606, 608 of interest to the portable subscriber unit 122. The reference frequency signal 614 is sent by each of the transmitters during all time slots not matching the transmitter number. Alternatively, the reference frequency signal 614 can be eliminated and silence substituted therefor.

Figure 7:
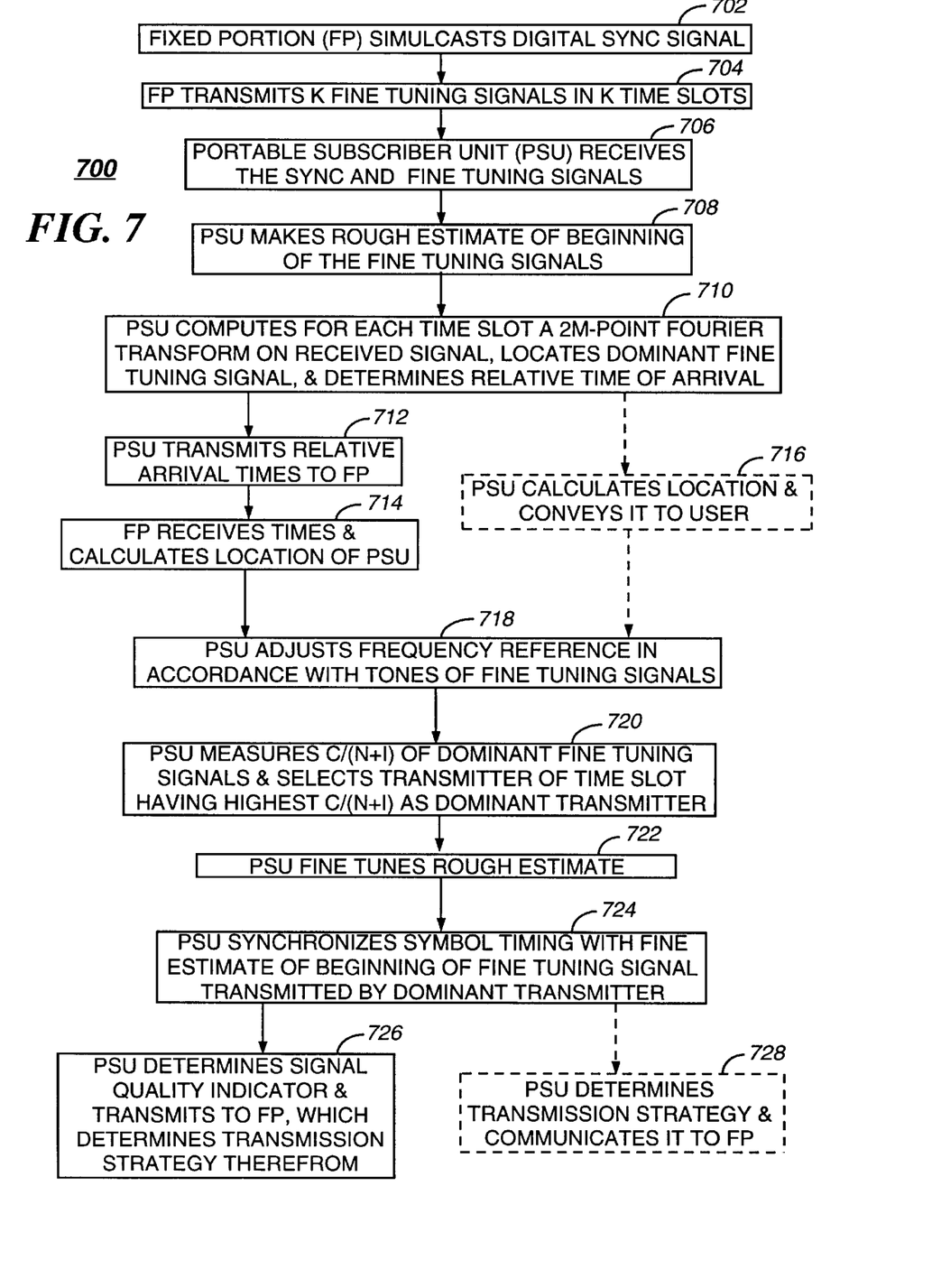
FIG. 7 is a flow chart depicting operation of the messaging system in accordance with the present invention.

FIG. 7 is a flow chart 700 depicting operation of the messaging system in accordance with the present invention. The flow chart 700 begins with the controller 112 controlling the base transmitters 206 to simulcast 702 the digital synchronization signal 502. Then the controller 112 controls 704 the base transmitters 206 to transmit K fine tuning signals during K time slots, each time slot assigned to one of the base transmitters 206, as described with reference to FIGS. 4–6, where K=12. Each fine tuning signal comprises a pair of tones separated in frequency by a predetermined amount and having a beginning characterized by a relative phase of a predetermined value, e.g., zero relative phase. The portable subscriber unit 122 receives 706 the digital synchronization signal 502 and makes 708 a rough estimate, e.g., accurate to about 150 μsec., of the beginning of the fine tuning signals 506 of each time slot 510 from the digital sync signal 502 and from knowledge of the predetermined arrangement of the time slots 510.

The portable subscriber unit 122 next computes 710 for each of the time slots 510 a 2M-point Fourier transform (FT)

on the received signal comprising M fine tuning signals received during the time slot from a base transmitter 206 of the cluster 402 and from M-1 corresponding base transmitters 206 of the adjacent clusters 404. For the exemplary messaging system arrangement described in FIGS. 4–6, M=7, and the results of the 14-point FT computation will be similar to FIG. 6 (less the reference frequency signal 614, which is not required by the portable subscriber unit 122). From the amplitudes produced by the FT computation, the processing system 306 determines for each time slot 510 the dominant fine tuning signal having the highest amplitude. In FIG. 6 this is the tone pair 602, 604. The processing system 306 also determines the relative arrival time of the dominant fine tuning signal from FT calculations performed on the dominant fine tuning signal, as described below.

The signal received by the portable subscriber unit 122 in a first cluster 402 during each time slot can be expressed as $$S(t) = A_1 \left( e^{j(\omega_{1_1}(t-\tau_1)+\phi_1)} + e^{j(\omega_{2_1}(t-\tau_1)+\phi_1)} \right) + \sum_{i=2}^{7} A_i (e^{j(\omega_{1_i}(t-\tau_i)+\phi_i)} + e^{j(\omega_{2_i}(t-\tau_i)+\phi_i)}) + n(t)$$

where $A_i$ is the signal amplitude from a transmitter of cluster i, $\omega_{1_i}$ and $\omega_{2_i}$ are the tone pair frequencies of transmitter cluster i, $\phi_i$ is the channel phase, $\tau_i$ is the transmission delay from a transmitter of cluster i, and n(t) is the background additive white Gaussian noise. S(t) can also be written in the following format $$S(t) = \left( A_1 e^{-j(\omega_{1_1}\tau_1)} e^{j\phi_1} \right) e^{j(\omega_{1_1}t)} + \left( A_1 e^{-j(\omega_{2_1}\tau_1)} e^{j\phi_1} \right) e^{j(\omega_{2_1}t)} + i(t) + n(t)$$

where i(t) is the signal contribution from secondary transmitters, i.e., transmitters of clusters adjacent to the first cluster 402.

Let $S(\omega)$ denote the Fourier transform of S(t), and $N(\omega)$ denote the Fourier transform of n(t). Let $\bar{S}(\omega)$ denote the complex conjugate of $S(\omega)$.

$$S(\omega_{1_1}) = A_1 e^{-j(\omega_{1_1}\tau_1)} e^{j\phi_1} + N(\omega_{1_1})$$

$$S(\omega_{2_1}) = A_1 e^{-j(\omega_{2_1}\tau_1)} e^{j\phi_1} + N(\omega_{2_1})$$

$$S(\omega_{1_1}) \times \bar{S}(\omega_{2_1}) = A_1^2 e^{-j(\omega_{1_1}-\omega_{2_1})\tau_1} + N(\omega_{1_1})\bar{N}(\omega_{2_1})$$

Note that the Fourier transform of i(t) is equal to zero at frequencies $\omega_{1_1}$ and $\omega_{2_1}$ because of the orthogonality among the tone pairs of adjacent clusters. An estimate of the time of arrival of the dominant tone pair during each time slot is $$e(\tau_1) = \frac{\text{Phase}(S(\omega_{1_1}) \times \bar{S}(\omega_{2_1}))}{\omega_{1_1} - \omega_{2_1}}.$$

It will be appreciated that the estimates of the arrival times are relative to the start of a window used for calculating the Fourier transforms. Thus for each time slot 510 the window should start with data corresponding to the beginning of the time slot, as determined from the digital sync signal 502 and knowledge of the time slot arrangement. Referring again to FIG. 7, the processing system 306 preferably next transmits 712 the estimates of the relative arrival times to the fixed portion 102 of the messaging system. The controller 112 then receives 714 from the base receivers 207 the relative arrival times and calculates the location of the portable subscriber unit 122 from the relative arrival times, utilizing well-known techniques. Alternatively, the portable subscriber unit 122 can be pre-programmed with a database of transmitter locations and other map information, and the portable subscriber unit 122 can calculate 716 its own location and then display the location to the user. This alternative is particularly applicable to a one-way messaging system. The processing system 306 preferably also maintains accurate tuning to the communications channel by adjusting 718 the frequency reference 303 in accordance with the tone pairs of the fine tuning signals. This is preferably accomplished by calculating additional FTs near one of the tones of the dominant tone pair to locate a frequency having the greatest amplitude. The difference between this frequency and the known (from the identity of the cluster), high precision frequency transmitted by the base transmitter 206 is the frequency error. The frequency error is then applied using well-known techniques to correct the output frequency of the frequency reference 303. Preferably, the frequency error is calculated for a plurality of time slots and the results averaged to gain improved accuracy from macro-diversity.

Next, the portable subscriber unit 122 measures 720 the carrier-to-noise-plus-interference ratio C/(N+I) of the dominant fine tuning signal of each of the time slots 510. This is preferably accomplished by summing the powers of the dominant tone pair of each time slot, and dividing the result by the sum of the powers of the other six interfering tone pairs from adjacent clusters 404. The base transmitter 206 corresponding to the time slot having the highest C/(N+I) is then selected as the dominant transmitter. The processing system 306 then fine tunes 722 the rough estimate of the beginning of the fine tuning signals by applying the estimate of the time of arrival of the tone pair corresponding to the dominant transmitter. This is accomplished by adding the computed arrival time of the beginning of the fine tuning signal relative to the start of the FT window to the known start time of the FT window. The processing system 306 then synchronizes 724 the symbol timing of the portable subscriber unit 122 from the fine tuned estimate of the beginning of the fine tuning signal. Advantageously, this technique can achieve a symbol timing accuracy to within a fraction of a microsecond.

The processing system 306 then preferably determines 726 a signal quality indicator corresponding to the highest C/(N+I) and transmits the signal quality indicator to the fixed portion 102 of the messaging system, using well-known techniques. The fixed portion 102 then determines a transmission strategy to use for the transmission of the data 508, e.g., transmission speed, power, beamed or omnidirectional transmission, to name a few. Alternatively, the processing system 306 can determine 728 the transmission strategy and communicate the transmission strategy to the fixed portion 102.

Thus, it should be clear from the preceding disclosure that the present invention provides a method and apparatus for synchronizing the portable subscriber unit when higher speed modulation techniques are employed. The present invention also advantageously provides a method and apparatus for locating the subscriber unit, keeping the subscriber unit on frequency, and determining the quality of the received signal.

Many modifications and variations of the present invention are possible in light of the above teachings. For example, while the present invention has been embodied in an exemplary 12-cell reuse pattern and a sub-channel bandwidth of 5600 Hz, the present invention also applies to other reuse patterns and other bandwidths. Thus, it is to be understood that, within the scope of the appended claims, the invention can be practiced other than as described herein above.

What is claimed is:

1. A method for facilitating an establishment of communications in a messaging system, the method comprising in K transmitters of each of M clusters including a first cluster and M-1 adjacent clusters, K and M being predetermined positive integers, the steps of:

simulcasting a digital sync signal; and thereafter transmitting, in each of the M clusters, K fine tuning signals during K time slots, each time slot assigned to one of the transmitters, wherein each fine tuning signal comprises a pair of tones separated in frequency by a predetermined amount and having a beginning characterized by a relative phase of a predetermined value, the method further comprising in a portable subscriber unit the steps of:

receiving the digital sync signal and the fine tuning signals;

making a rough estimate of the beginning of the fine tuning signals from the digital sync signal and from knowledge of a predetermined arrangement of the time slots;

computing for each of the time slots a 2M-point Fourier transform (FT), at frequencies corresponding to the pair of tones of each fine tuning signal, on a received signal comprising M fine tuning signals received during the time slot from a transmitter of the first cluster and from M-1 corresponding transmitters of adjacent clusters; and fine tuning the rough estimate through FT calculations corresponding to at least one of the fine tuning signals, thereby generating a fine estimate of the beginning of the at least one of the fine tuning signals.

2. The method of claim 1, further comprising in the portable subscriber unit the steps of:

locating for each time slot a dominant fine tuning signal having a highest amplitude; and determining for each time slot a relative time of arrival of the dominant fine tuning signal from FT calculations corresponding to the dominant fine tuning signal.

3. The method of claim 1, further comprising in the portable subscriber unit the step of transmitting, to a fixed portion of the messaging system, a plurality of relative times of arrival determined for a plurality of dominant fine tuning signals; and further comprising in the fixed portion the steps of:

receiving the plurality of relative times of arrival; and calculating therefrom a location at which the portable subscriber unit is positioned.

4. The method of claim 1, further comprising in the portable subscriber unit the steps of determining for a plurality of dominant fine tuning signals a plurality of relative times of arrival;

calculating a location from the plurality of relative times of arrival; and conveying the location to a user of the portable subscriber unit.

5. The method of claim 1, wherein the messaging system includes a second cluster of K additional transmitters adjacent to the first cluster, and wherein the method further comprises in the K additional transmitters the step of transmitting during the K time slots K additional fine tuning signals each comprising another pair of tones separated in frequency by the predetermined amount and shifted in frequency from the pair of tones of the first cluster by a predetermined frequency shift.

6. The method of claim 1, further comprising in the portable subscriber unit the step of adjusting a frequency reference in accordance with the pair of tones for keeping the portable subscriber unit accurately tuned to a communication channel.

7. The method of claim 1, further comprising in the portable subscriber unit the steps of:

locating for each time slot a dominant fine tuning signal having a highest amplitude;

measuring a carrier-to-noise-plus-interference ratio (C/(N+I)) of the dominant fine tuning signal of each time slot; and selecting as a dominant transmitter one of the transmitters corresponding to the time slot having a highest C/(N+I).

8. The method of claim 7, further comprising in the portable subscriber unit the step of synchronizing a symbol timing adjustment with the fine estimate of the beginning of the at least one of the fine tuning signals, the at least one of the fine tuning signals transmitted by the dominant transmitter.

9. The method of claim 7, further comprising in the portable subscriber unit the steps of determining a transmission strategy to use for further communications with a fixed portion of the messaging system, the transmission strategy determined from the highest C/(N+I); and communicating the transmission strategy to the fixed portion of the messaging system.

10. The method of claim 7, further comprising in the portable subscriber unit the steps of:

determining a signal quality indicator from the highest C/(N+I); and transmitting the signal quality indicator to a fixed portion of the messaging system.

11. The method of claim 10, further comprising in the fixed portion of the messaging system the step of determining a transmission strategy to use for further communications with the portable subscriber unit, the transmission strategy determined from the signal quality indicator.

12. A portable subscriber unit for facilitating an establishment of communications in a messaging system, the portable subscriber unit comprising:

a receiver for receiving a digital sync signal and K fine tuning signals transmitted by K base transmitters in each of M clusters comprising a first cluster and M-1 adjacent clusters in a fixed portion of the messaging system during K time slots, K and M being predetermined positive integers, wherein each fine tuning signal comprises a pair of tones separated in frequency by a predetermined amount and having a beginning characterized by a relative phase of a predetermined value; and a processing system coupled to the receiver for making a rough estimate of the beginning of the fine tuning signals from the digital sync signal and from knowledge of a predetermined arrangement of the time slots, wherein the processing system is programmed to
compute for each of the time slots a 2M-point Fourier transform (FT), at frequencies corresponding to the pair of tones of each fine tuning signal, on a received signal comprising M fine tuning signals received during the time slot from a transmitter of the first cluster and from M-1 corresponding transmitters of adjacent clusters; and
fine tune the rough estimate through FT calculations corresponding to at least one of the fine tuning signals, thereby generating a fine estimate of the beginning of the at least one of the fine tuning signals.

13. The portable subscriber unit of claim 12, wherein the processing system is further programmed to:
locate for each time slot a dominant fine tuning signal having a highest amplitude; and
determine for each time slot a relative time of arrival of the dominant fine tuning signal from FT calculations corresponding to the dominant fine tuning signal.

14. The portable subscriber unit of claim 12, further comprising
a unit transmitter coupled to the processing system for transmitting information to the fixed portion of the messaging system,
wherein the processing system is further programmed to control the unit transmitter to transmit, to the fixed portion of the messaging system, a plurality of relative times of arrival determined for a plurality of dominant fine tuning signals.

15. The portable subscriber unit of claim 12, wherein the processing system is further programmed to:
determine for a plurality of dominant fine tuning signals a plurality of relative times of arrival;
calculate a location from the plurality of relative times of arrival; and
convey the location to a user of the portable subscriber unit.

16. The portable subscriber unit of claim 12, further comprising
a frequency reference coupled to the processing system and coupled to the receiver for tuning the portable subscriber unit to a communication channel, wherein the processing system is further programmed to adjust the frequency reference in accordance with the pair of tones for keeping the portable subscriber unit accurately tuned to the communication channel.

17. The portable subscriber unit of claim 12, wherein the processing system is further programmed to:
locate for each time slot a dominant fine tuning signal having a highest amplitude;
measure a carrier-to-noise-plus-interference ratio (C/(N+I)) of the dominant fine tuning signal of each time slot; and
select as a dominant base transmitter a base transmitter corresponding to the time slot having a highest C/(N+I).

18. The portable subscriber unit of claim 17, wherein the processing system is further programmed to synchronize a symbol timing with the fine estimate of the beginning of the at least one of the fine tuning signals, the at least one of the fine tuning signals transmitted by the dominant base transmitter.

19. The portable subscriber unit of claim 17, further comprising
a unit transmitter coupled to the processing system for transmitting information to the fixed portion of the messaging system,
wherein the processing system is further programmed to:
determine a transmission strategy to use for further communications with a fixed portion of the messaging system, the transmission strategy determined from the highest C/(N+I); and
control the unit transmitter to communicate the transmission strategy to the fixed portion of the messaging system.

20. The portable subscriber unit of claim 17, further comprising
a unit transmitter coupled to the processing system for transmitting information to the fixed portion of the messaging system,
wherein the processing system is further programmed to:
determine a signal quality indicator from the highest C/(N+I); and
control the unit transmitter to transmit the signal quality indicator to the fixed portion of the messaging system.

21. A controller for facilitating an establishment of communications in a messaging system including K base transmitters in each of M clusters comprising a first cluster and M-1 adjacent clusters, K and M being predetermined positive integers, the controller comprising:
a network interface for receiving a message;
a processing system coupled to the network interface for processing the message; and
a base station interface coupled to the processing system for controlling the base transmitters to transmit the message and for cooperating with a base receiver to receive a response from a portable subscriber unit,
wherein the processing system is programmed to:
control the base transmitters to simulcast a digital sync signal; and
further control the base transmitters to transmit, in each of the M clusters, K fine tuning signals during K time slots, each time slot assigned to one of the base transmitters, wherein each fine tuning signal comprises a pair of tones separated in frequency by a predetermined amount and having a beginning characterized by a relative phase of a predetermined value.

22. The controller of claim 21,
wherein the messaging system includes a second cluster of K additional base transmitters adjacent to the first cluster, and
wherein the processing system is further programmed to control the additional base transmitters to transmit during the K time slots K additional fine tuning signals each comprising another pair of tones separated in frequency by the predetermined amount and shifted in frequency from the pair of tones of the first cluster by a predetermined frequency shift.

23. The controller of claim 21, wherein the processing system is further programmed to determine a transmission strategy to use for further communications with the portable subscriber unit, the transmission strategy determined from a signal quality indicator received from the portable subscriber unit.

24. The controller of claim 21, wherein the processing system is further programmed to:
receive a plurality of relative times of arrival from the portable subscriber unit; and
calculate therefrom a location at which the portable subscriber unit is positioned.

* * * * *